April 15, 1930.  W. G. BEAN ET AL  1,754,930
CUTTER HEAD
Filed June 4, 1928
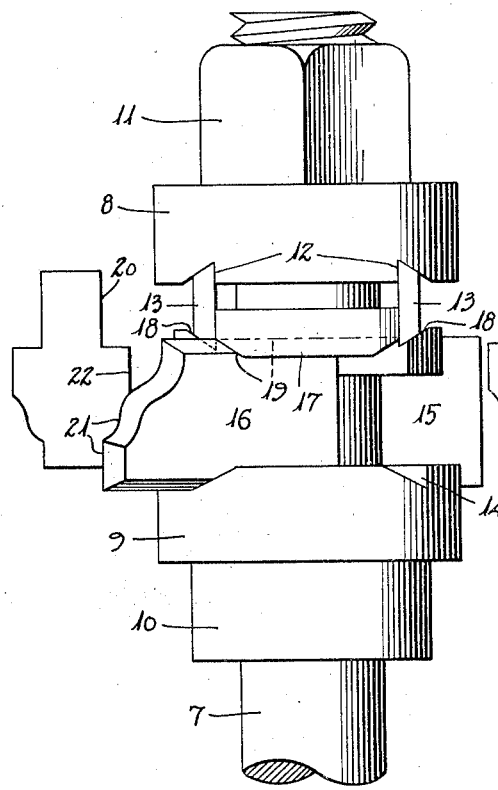
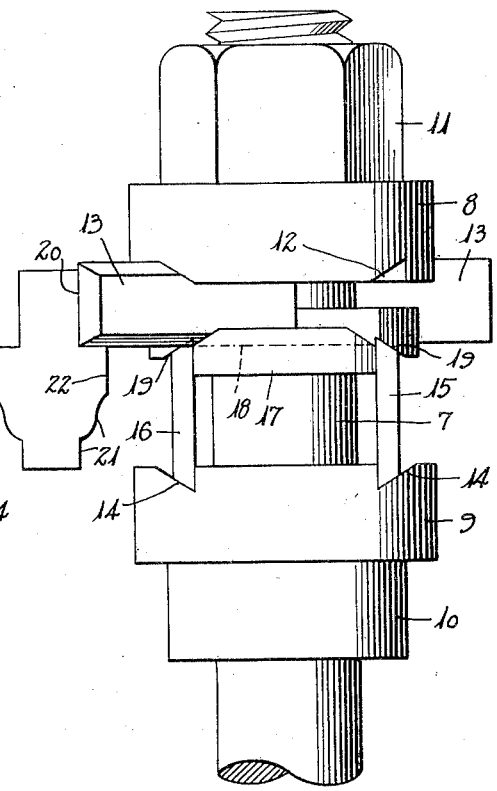
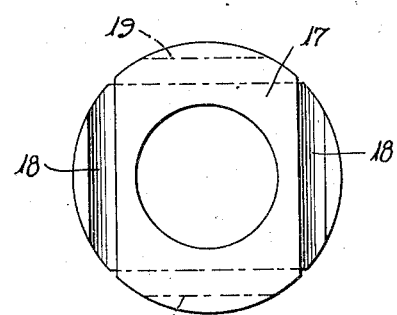
Inventors:
U. M. Cool
Wm. G. Bean
By Monroe Miller
Attorney

UNITED STATES PATENT OFFICE

WILLIAM G. BEAN AND ULYSSES M. COOL, OF BURBANK, CALIFORNIA

CUTTER HEAD

Application filed June 4, 1928. Serial No. 282,850.

The present invention relates to cutter heads for shapers, such as are used for shaping the parts of window sashes and doors which receive the glass panes, or for similar purposes, and it is an object of the invention to provide novel and improved cutter head which can simultaneously finish several different surfaces of the wood, in order to eliminate separate operations as heretofore required.

Another object is the provision of a cutter head of the kind indicated having novel provisions for receiving and holding the knives or cutters, in order that they may completely finish the corresponding side of the stick or bar of wood.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

The invention is illustrated in the accompanying drawing, wherein—

Figure 1 is a side elevation of the improved cutter head.

Fig. 2 is a side elevation looking at right angles to the line of view in Fig. 1.

Fig. 3 is a plane view of the intermediate collar.

On the shaft or spindle 7 are disposed the collars 8 and 9, the latter seating against a shoulder or abutment 10 on the spindle, and a nut 11 is threaded on the terminal of the spindle to clamp the collars and other parts between said nut and the abutment 10.

The collar 8 has chordal grooves 12 across its inner face receiving the knives or cutters 13, and the collar 9 has chordal grooves 14 extending across its confronting face and receiving the knives or cutters 15 and 16.

An intermediate collar 17 is disposed on the spindle, and has the chordal grooves 18 and 19 extending across its opposite faces, with the grooves 18 parallel with one another and at right angles to the parallel grooves 19. The grooves 18 receive the cutters 13, while the grooves 19 receive the cutters 15 and 16, whereby the cutters 13 are clamped between the collars 8 and 17, while the cutters 15 and 16 are clamped between the collars 9 and 17, when the nut 11 is tightened.

The grooves 18 and 19 of the collar 17 are of such depth as to extend beyond a common plane parallel with the faces of the collar, whereby the adjacent edges of the cutters 13 and the cutters 15, 16 extend slightly beyond said common plane, to obtain overlapping cuts.

The edges of the cutters are bevelled and the grooves are also bevelled or chamfered, and the cutters may be individually adjusted when the nut 11 is loosened.

The cutters 13, as seen in Fig. 2, will cut the rabbet or surface 20 of the wood stick or bar; the cutter 16 cuts the surface 21 to produce the molding effect; and the cutter 16 finishes the surface 22 for a rail or style of a window sash, door, or the like, although the cutters may be of different kinds for doing work of various sorts. The cuts made by the cutters 13 and by the cutters 15, 16 will overlap, thereby providing for smooth, accurate and neat work, and the surfaces 20, 21 and 22 may be simultaneously finished with a saving in time, instead of requiring separate operations.

The cutter head may be used for curved as well as straight work, such as for curved rails of curved window sashes, and the like.

Having thus described the invention, what is claimed as new is:—

A cutter head comprising a spindle, three collars thereon having complementing grooves in their confronting faces, and cutters between the collars seated in said grooves, the grooves in the opposite faces of the intermediate collar being arranged at an angle to one another in chordal positions on the collar and said grooves being of such depth as to extend beyond a common plane so that the cutters produce overlapping cuts, the grooves and cutters being arranged in pairs at the opposite sides of the spindle.

In testimony whereof we hereunto affix our signatures.

WILLIAM G. BEAN.
ULYSSES M. COOL.